(12) United States Patent
Hueftle et al.

(10) Patent No.: US 6,276,198 B1
(45) Date of Patent: Aug. 21, 2001

(54) DEVICE FOR MEASURING THE MASS OF A FLOWING MEDIUM

(75) Inventors: Gerhard Hueftle, Aspach (DE); Thomas Alber, Anderson, SC (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/068,795

(22) PCT Filed: Aug. 19, 1997

(86) PCT No.: PCT/DE97/01771

§ 371 Date: May 18, 1998

§ 102(e) Date: May 18, 1998

(87) PCT Pub. No.: WO98/12509

PCT Pub. Date: Mar. 26, 1998

(30) Foreign Application Priority Data

Sep. 16, 1996 (DE) .............................................. 1 96 37 647

(51) Int. Cl.[7] ...................................................... G01F 1/68
(52) U.S. Cl. ...................................... 73/204.21; 73/118.2
(58) Field of Search ........................... 73/204.18, 204.21, 73/118.2, 204.11, 202.5

(56) References Cited

U.S. PATENT DOCUMENTS

| | | | | |
|---|---|---|---|---|
| 2,255,771 | * | 9/1941 | Golay | 73/204.21 |
| 3,683,692 | * | 8/1972 | Lafitte | 73/202.5 |
| 4,412,449 | * | 11/1983 | Eiermann et al. | 73/204.21 |
| 5,081,866 | * | 1/1992 | Ochiai et al. | 73/204.21 |
| 5,167,147 | * | 12/1992 | Peters et al. | 73/118.2 |
| 5,253,517 | * | 10/1993 | Molin et al. | 73/118.2 |
| 5,596,969 | * | 1/1997 | Lipinski | 73/204.21 |
| 5,918,279 | * | 6/1999 | Hetch et al. | 73/204.21 |

* cited by examiner

*Primary Examiner*—Harshad Patel
(74) *Attorney, Agent, or Firm*—Ronald E. Greigg; Edwin E. Greigg

(57) ABSTRACT

A device for measuring the mass of a flowing medium having a measurement element accommodated in a measurement support, and a flow rectifier with a grid provided upstream of the measurement element. For simple production and accurate alignment of the grid, a carrier ring is provided, which carries the grid, so that there are two parts, that is, a flow rectifier and a carrier ring with the grid; by crimping over an annular edge of the measurement support, a durable fastening of the flow rectifier is accomplished. The device is intended for measuring the mass of a flowing medium, of aspirated air in internal combustion engines.

6 Claims, 2 Drawing Sheets

DEVICE FOR MEASURING THE MASS OF A FLOWING MEDIUM

PRIOR ART

The invention is based on a device for measuring the mass of a flowing medium, also known as a flow rate meter. A device is already known (European Patent Application EP 0 458 998), which has a measurement element accommodated in a measurement support, and in which upstream of the measurement element a flow rectifier with a grid is provided. The flow rectifier is provided to generate the evenest possible flow over the entire inside cross section. The grid, durably secured to the flow rectifier, serves to generate superfine eddies, as a result of which downstream of the grid flow conditions that remain constant are intended to be created, in order to stabilize the measurement signal. To avoid scattering in the characteristic curve of the measurement signal output by the measurement element, it is especially important for the grid to be oriented in a precise alignment with the flow rectifier. In the known device, the grid is secured to the flow rectifier by embedding the grid in the heated state in a ring of the flow rectifier. However, this has the disadvantage that plastic forced out in the embedding process remains in the flow rectifier, thus creating obstacles in the flow that cause signal scattering, especially in mass production. Moreover, the mode of fastening the flow rectifier, provided by deforming ribs and grooves, is relatively complicated and expensive. Moreover, the intended embodiment of a ring, with protrudes from a surface of the flow rectifier that is disposed at right angles to the flow direction, is complicated from a production standpoint. Since the grid is durably secured to the flow rectifier, flow rectifiers with grids of different mesh widths can be combined arbitrarily with one another only with relative difficulty.

ADVANTAGES OF THE INVENTION

The device according to the invention for measuring the mass of a flowing medium, has the advantage over the prior art that in an especially simple way, devices that have a flow rectifier with a grid can be produced in various versions. It is especially advantageous in this respect that the production costs can be lowered by a simple mode of production.

It is advantageous that special shapes of the flow rectifier with the wire grid can be achieved in a simple way. Moreover, grids of differing mesh width and wire thickness can be made without particular expense for tools. A burr-free embedding of the grid, which can be accomplished by melting off the expelled material is especially advantageous. It is also advantageous that the wire mesh can be mounted on a carrier ring without sagging. It is advantageously possible to attain any desired spacing between the flow rectifier and the grid by means of the embodiment of the width of the carrier ring. For an intended dismantling, the flow rectifier and the grid are individually present and can then easily be separated for intended recycling. Moreover, it is possible to build in a plurality of grids even upstream of the flow rectifier. It is especially advantageous in this respect that the flow rectifier with the grid can be produced very economically by mass production.

BRIEF DESCRIPTION OF THE DRAWINGS

One exemplary embodiment of the invention is shown in simplified form in the drawings and described in further detail in the ensuing description.

DESCRIPTION OF THE EXEMPLARY EMBODIMENT

Figure 1:
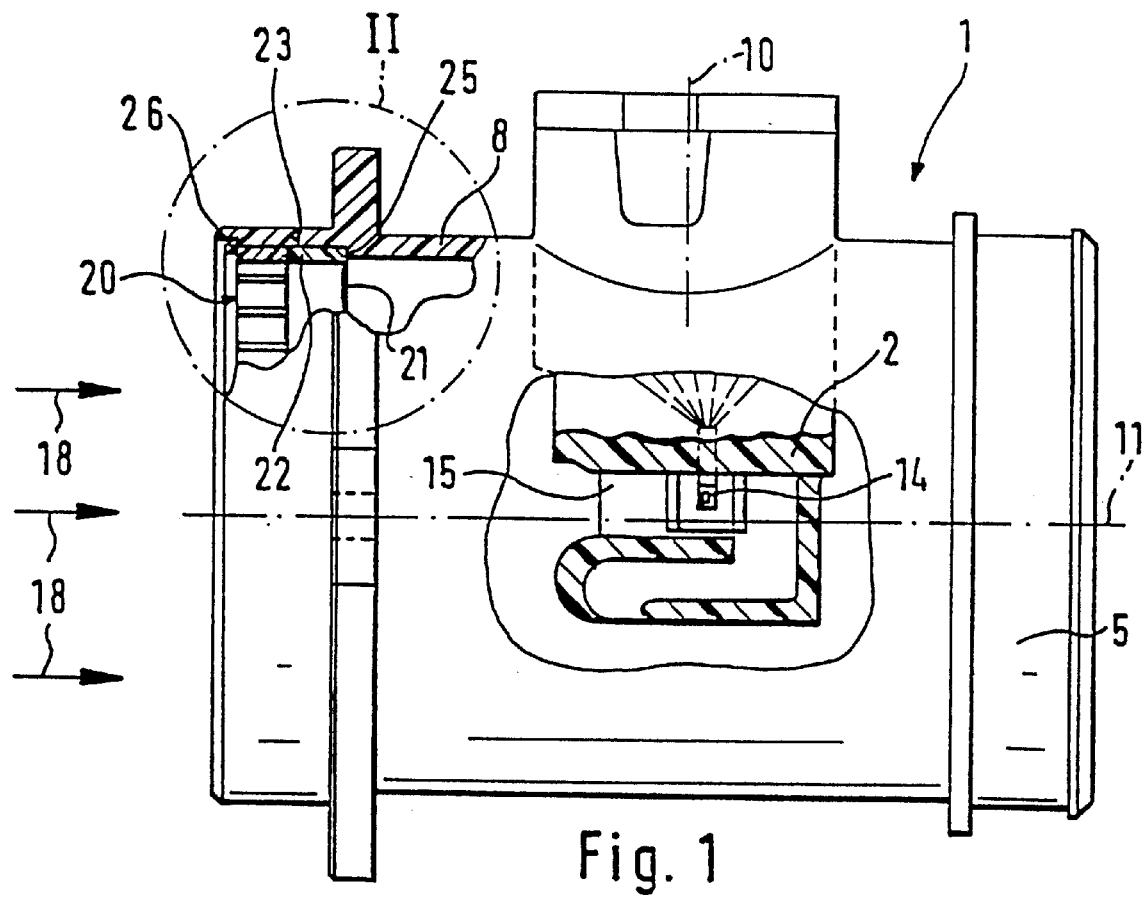
FIG. 1 shows a device in a fragmentary sectional view.
Figure 2:
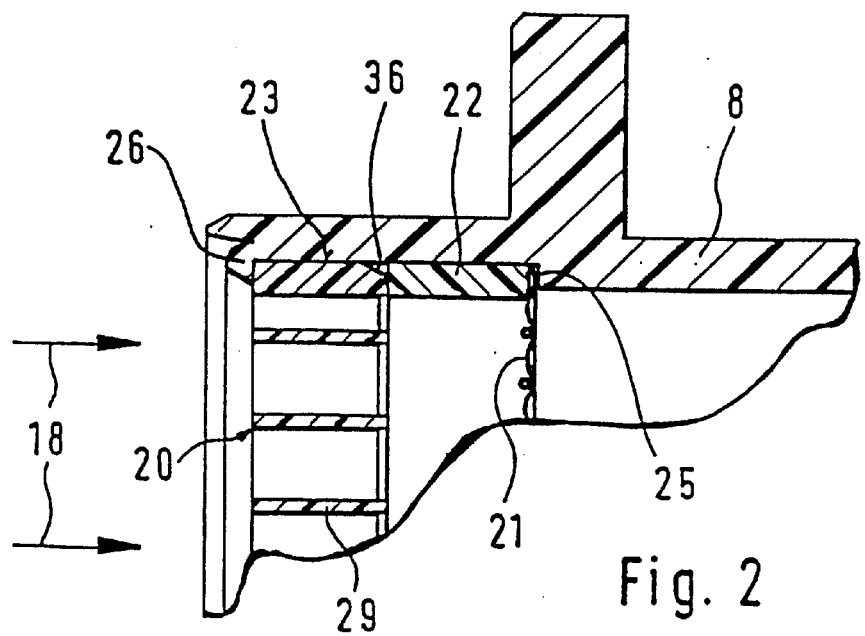
FIG. 2 shows an enlarged detail of the device within the dot-dashed line II of FIG. 1.
Figure 3:
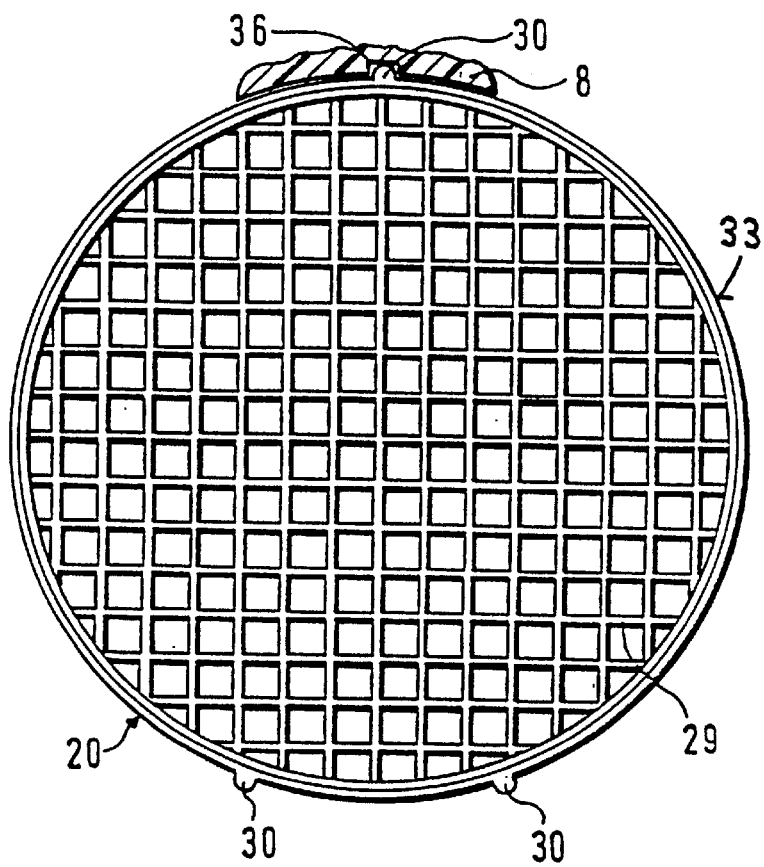
FIG. 3 is a plan view on a flow rectifier.
Figure 5:
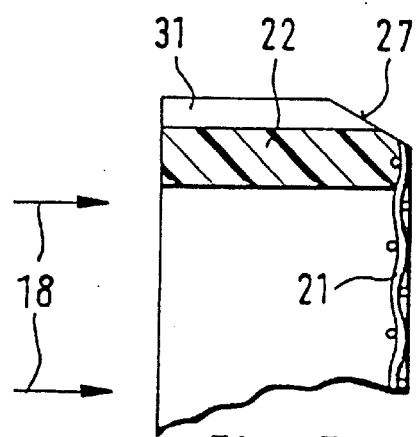
FIG. 5 is a fragmentary side view of the grid of FIG. 4.

In FIG. 1, a device 1 for measuring the mass of a flowing medium, especially the mass of air aspirated by internal combustion engines, is shown in cross section. The engine may be a mixture-compressing engine with externally supplied ignition, or an air-compressing, self-igniting engine. The device 1 has a measurement part 2, which is inserted in plug-in fashion, for instance, into a measurement support 5 of the device 1. The measurement part 2 is slender and rodlike in form, for instance, with a square cross section and extends in elongated fashion in the direction of an insertion axis 10, and it is inserted, for instance in plug-in fashion, into an opening made out of a wall 8 of the measurement support 5. The wall 8 defines a flow cross section, which for instance has a circular cross section, in the center of which a center axis 11 extends in the direction 18 of the flowing medium, parallel to the wall 8, being oriented perpendicular to the insertion axis 10. The direction of the flowing medium is indicated in FIGS. 1, 2 and 5 by corresponding arrows 18 and extends there from left to right.

A measurement element 14 is inserted with the measurement part 2 into the flowing medium. In the measurement part 2 of the device 1, a measurement conduit 15 is formed, in which the measurement element 14 for measuring the medium flowing in the measurement support 5 is accommodated. The construction of this kind of measurement part 2 with a measurement element 14 is sufficiently familiar to one skilled in the art, for example from German Published Patent Application DE-OS 44 07 209; U.S. application Ser. No. 08/545,583, filed Nov. 3, 1995, whose disclosure is hereby incorporated by reference into the present patent application.

Figure 4:
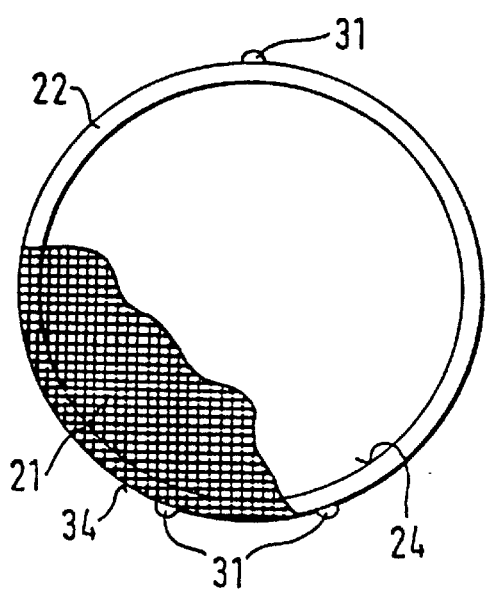
FIG. 4 is a plan view on a grid.

Upstream of the measurement element 14, a flow rectifier 20 with a grid 21 is provided. The flow rectifier 20 is a plastic, and it can be made by injection molding. Downstream of the flow rectifier 20, a carrier ring 22 is provided, which carries the grid 21. The carrier ring 22 comprises thermoelastic plastic. The grid 21 for instance comprises a metal, such as special steel, that is slow to react, and it may have an arbitrary wire thickness and mesh width. The wire mesh of the grid 21 is secured by being embedded into the plastic of the carrier ring 22. This can be done for instance by ultrasound welding or by hot embedding. The plastic expelled when the wire mesh is embedded can be eliminated for instance by means of a laser, by melting along the annular contour 24 shown in FIG. 4, in order to avoid any impedance from plastic protruding from the edge of the annular contour 24.

For mounting the grid 21, the grid is introduced along with the carrier ring 22 into an opening 23, which for instance is circular, provided on the upstream end of the measurement support 5, until the carrier ring 22 rests against a stop 25, with the grid 21 located downstream. Next, the flow rectifier 20 can be inserted into the opening 23 until it rests on the carrier ring 22. For durable fastening of the flow rectifier 20 with the grid 21, an annular edge 26 that remains at the end of the measurement support 5 can be permanently deformed, for instance by being crimped over, so as to secure the flow rectifier 20 along with the grid 21 in the measurement support 5. The crimping can be done by melting the plastic of the measurement support 5, for instance by means of ultrasound or by hot deformation. It is also conceivable to deform the annular edge 26 only along part of its circumference.

As shown in FIG. 5, which is a side view on the carrier ring 22 along with the grid 21, the grid for the sake of easy installation can have a bevel 27, which can be made for instance by using a laser beam to melt the plastic. For unequivocal radial positional fixation of the grid 21, for instance in alignment with a plastic grid 29 of the flow rectifier 20, ribs 30, 31 are provided, which protrude radially from the jacket face 33 of the flow rectifier 20 and the jacket face 34 of the carrier ring 22, so that they can be introduced into corresponding grooves in the opening 23 of the measurement support 5. In the present exemplary embodiment, three ribs 30, for instance, are provided on the flow rectifier 20 and three ribs 31, for instance, on the carrier ring 22. Correspondingly, the opening 23 of the measurement support 5 has three grooves 36, which are capable of receiving the ribs 30, 31.

Located on the downstream end of the measurement support 5 is a guard grid, not shown in further detail, which is intended to protect the measurement part 2 against mechanical actions, such as being touched directly by a hand. It is made with such wide mesh that it does not significantly affect either the measurement precision of the measurement element 14 nor the flow rate of the air.

The foregoing relates to preferred exemplary embodiments of the invention, it being understood that other variants and embodiments thereof are possible within the spirit and scope of the invention, the latter being defined by the appended claims.

What is claimed is:

1. A device for measuring the mass of a flowing medium in a measurement support comprising a measurement element disposed in the flowing medium in said measurement support, a flow rectifier (20), provided upstream of the measurement element (14), and a grid (21) downstream of the flow rectifier, the grid (21) is mounted on a separate carrier ring (22), and both the carrier ring (22) and the flow rectifier (20) are introduced into an opening (23) of the measurement support (5) and fixed therein independent of each other.

2. A device in accordance with claim 1, in which the flow rectifier (20) and the carrier ring (22) are fixed within the measurement support (5) by deformation of an annular contour (26) of the measurement support (5).

3. A device in accordance with claim 1, in which the carrier ring (22) comprises plastic, and the grid (21) is secured to the carrier ring (22) by ultrasound welding or hot embedding.

4. A device in accordance with claim 3, in which the grid (21) has a bevel (27).

5. A device in accordance with claim 4, in which the bevel (27) is effected by melting off the plastic.

6. A device in accordance with claim 4, in which the bevel (27) is melted off by use of a laser.

* * * * *